United States Patent
Geutskens

(10) Patent No.: US 7,151,720 B2
(45) Date of Patent: Dec. 19, 2006

(54) RECORDING APPARATUS FOR RECORDING DATA ON OPTICALLY READABLE DISCS

(75) Inventor: Yoeri Bas Geutskens, Eindhoven (NL)

(73) Assignee: Koninklijke Philips Electronics, Eindhoven (NL)

( * ) Notice: Subject to any disclaimer, the term of this patent is extended or adjusted under 35 U.S.C. 154(b) by 821 days.

(21) Appl. No.: 10/225,385

(22) Filed: Aug. 21, 2002

(65) Prior Publication Data

US 2003/0039187 A1  Feb. 27, 2003

(30) Foreign Application Priority Data

Aug. 24, 2001 (EP) .................... 01203195

(51) Int. Cl.
G11B 7/00 (2006.01)
(52) U.S. Cl. .................. 369/44.26; 369/47.1; 369/53.1; 369/59.1
(58) Field of Classification Search .............. None
See application file for complete search history.

(56) References Cited

U.S. PATENT DOCUMENTS 5,475,662 A * 12/1995 Miyagawa et al. ...... 369/44.26
6,337,839 B1 * 1/2002 Nakane et al. ........... 369/59.25

FOREIGN PATENT DOCUMENTS

EP  1067545 A2  10/2001

OTHER PUBLICATIONS

"Standard EMCA-267: 120 mm DVD—Read-Only Disk" Apr. 2001, EMCA: Standardizing Information And Communication Systems, pp. 4-5 & 35-37.
"Standard EMCA-279: 80 mm and 120 mm DVD—Recordable Disk (DVD-R)" Dec. 1998, EMCA: Standardizing Information And Communication Systems, pp. 37-39.
"Standard EMCA-272: 120 mm DVD Rewritable Disk" Jun. 1999, EMCA: Standardizing Information And Communication Systems, pp. 35-39.
"Standard EMCA-274: Data Interchange on 120 mm Optical Disk using +RW Format" Jun. 1999, EMCA: Standardizing Information And Communication Systems, pp. 35-39.

* cited by examiner

Primary Examiner—Muhammad Edun

(57) ABSTRACT

Method of recording control signals on a removable optically readable disc like recording device comprising recording control data representing the physical structure of an optically readable disc. The control data set either being a standardized set of control data corresponding to the record carrier or either being a non-standardized set of control data deviating form the standardized set of control data signals. Preferably the non-standardized set of control data relates to different values for the number of information layers present on the record carrier or the type of record carrier being of the read-only type, recordable or rewritable type. Preferably a user may select the non-standardized set of control data by selecting a corresponding type of playback and/or recording apparatus.

10 Claims, 4 Drawing Sheets

| BP | Contents | Number of bytes |
|---|---|---|
| 0 | Book type and Part version | 1 byte |
| 1 | Disc size and minimum read-out rate | 1 byte |
| 2 | Disc structure | 1 byte |
| 3 | Recorded density | 1 byte |
| 4 to 15 | Data area allocation | 12 bytes |
| 16 | BCA descriptor | 1 byte |
| 17 to 31 | reserved | 15 bytes |
| 32 to 2047 | reserved | 2016 bytes |

(BP 0) Book type and Part version

| b7 | b6 | b5 | b4 | b3 | b2 | b1 | b0 |
|---|---|---|---|---|---|---|---|
| Book type | | | | Part version | | | |

(BP 2) Disc structure

| b7 | b6 | b5 | b4 | b3 | b2 | b1 | b0 |
|---|---|---|---|---|---|---|---|
| Reserved | Number of layers | | Track path | Layer type | | | |

(BP 3) Recorded density

| b7 | b6 | b5 | b4 | b3 | b2 | b1 | b0 |
|---|---|---|---|---|---|---|---|
| Linear density | | | | Track density | | | |

(BP 1) Disc size and Maximum transfer rate of the disc

| b7 | b6 | b5 | b4 | b3 | b2 | b1 | b0 |
|---|---|---|---|---|---|---|---|
| Disc size | | | | Maximum transfer rate of the disc | | | |

FIG. 3

RECORDING APPARATUS FOR RECORDING DATA ON OPTICALLY READABLE DISCS

The invention relates to a method of setting up user preferences on a recording device for recording on removable disc like record carriers, such as an optically readable disc, as recited in the preamble of claim 1.

The invention relates further to a recording device for recording on removable disc like record carriers, such as an optically readable disc, as recited in the preamble of claim 6.

Optically readable record carriers such as CD (Compact Disc) or DVD disc (Digital Versatile Discs) are available in a variety of different versions. Apart from read-only discs, which contain pre-recorded information recorded by a content provider, recordable as well as rewritable discs, which can contain information recorded by a user, are available. The pre-recorded disc may contain information in the form of pre-pressed pits in a substrate applied by an injection moulding process. The recordable disc may contain a light sensitive layer adapted to change under the influence of a scanning recording laser beam while the rewritable disc may contain a liquid crystal layer which can changed locally into an amorphous or crystalline state by a scanning recording laser beam. Further a disc may contain several information layers, some of them even being of a different information density, such as for example the Super Audio CD (SACD). In addition several types of recordable and rewritable DVD are available, commonly known as DVD-RW, DVD+RW, DVD-R, DVD+R and DVD-RAM, each type not only differing in the technology used but also in the format used. So apart form physical incompatibility, a logical incompatibility may exist.

Recorders adapted to record user information, such as digitally A/V or data information on an optically readable disc should preferably generate a recorded disc which can be played back on as much as types of playback devices as possible. This is not trivial. Existing DVD players have been developed without knowledge of the later developed DVD-recorder/players. Further different manufacturers have adapted own standards. So it may happen that a DVD-RW disc recorded on a DVD-RW recorder, may not be recognized or dealt with by a DVD player of the same or another manufacturer, due to physical or logical problems. Of course, although playback compatibility is often taken into account in designing and development, a full guarantee cannot be obtained in practice.

It is an object of the invention to overcome the above-mentioned disadvantage. According to one of its aspects the method according to the invention is characterized as recited in the characterizing part of claim 1.

According to one of its aspects a recording apparatus according to the invention is characterized as recited in the characterizing of claim 6.

By modifying part of the control data, another playback or recording device then the current recording apparatus may cause to accept the disc in case the standardized control data does not cause acceptance of the disc.

An advantageous embodiment is obtained as defined by the characterizing part of claim 2. As a DVD-RW disc does have a lower reflectance than a DVD-ROM disc, causing the DVD-ROM player to interpret the disc as a dual layer disc. By setting the control data relating to the number of layers of a single layer disc, to a dual layer disc, acceptance by the DVD-ROM player.

Another advantageous embodiment is obtained as defined by the characterizing part of claim 3. Indicating a recordable disc being of the read-only type may have the same effect by a read-only player.

Further advantageous embodiments are obtained as defined by the characterizing part of claim 5. By selecting the type player which rejects the recorded disc, a pre-defined corresponding set of control data adjusted for this type of player may be chosen.

Further advantageous embodiments of the invention are recited in other, dependent claims.

Theses and further aspects and advantages of the invention will be apparent from and elucidated in more detail hereinafter with reference to the disclosure of preferred embodiments, in particular with reference to the appended figures in which, FIG. 1 illustrates the structure of a Control Data block of a DVD-disc according to the invention, FIG. 2 illustrates the Physical Format Information within a Control Data Block of a DVD disc of FIG. 1

FIG. 3 illustrates the possible bit settings of the Physical Format Information of a DVD disc of FIG. 1

Figures 1, 2:
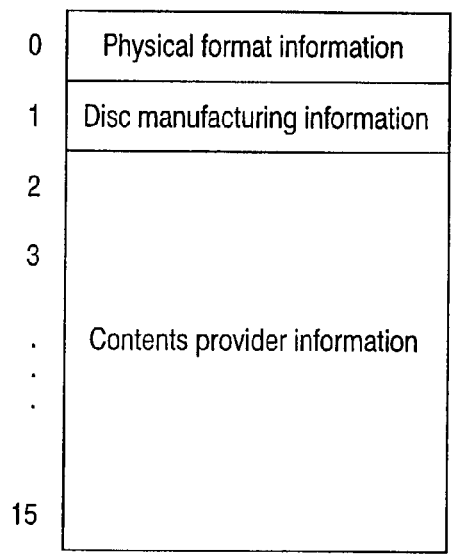

FIG. 1 illustrates the content of a Control Data Block of a DVD disc according to the invention. Within the Lead-in area, the innermost area of the disc, a so called Control Data Zone is being defined containing Physical Format Information, Disc Manufacturing Information and Contents Provider Information. This is contained in multiple Control Data Blocks of 16 sectors of 2048 bytes each. One sector in a Control Data Block comprises Physical Format Information.

FIG. 2 illustrates the content of the Physical Format Information according to the DVD disc. The content of bytes 0 to 3 (BP(0) to BP(2)) is illustrated in FIG. 3.

Bits b7 to b4 of byte 0 (BP(0)) specify the Book Type. In case of a Read-only (ROM) disc, these are set to 0000b, in case of a rewritable disc to 0001b, in case of a recordable disc to 0010b. No other bit settings have been defined with respect to the standard for DCD-ROM. However, in case of a DVD-RW disc, the bit setting 0010b is used to indicate a DVD-R disc and to 0011b to indicate a DVD–RW disc. In case of a DVD+RW disc the bits are set to 1001b. A further bit setting may be used to indicate a DVD+R disc.

Bits b3 to b4 of byte 0 define the part version. In case of DVD-ROM 0001b is used to indicate version 1.0, in case of DVD+RW 0010b is used to indicate the description of DVD+RW version 1. In case of DVD-RW 0101b is used to indicate version 2.

Bits b7 to b4 of byte 1 (BP(1)) define the disc size: 0000b for a 12 cm disc, 0001b for a 8 cm disc. Bytes b3 to b0 define the Minimum read-out rate: 0000b for 2.52 Mbps, 0001b for 5.04 Mbps and 0010b for 10.08 Mbps.

Bits b6 to b5 of byte 2 (BP(2)) define the number of layers: 00b for a single layer, 01b for a dual layer.

Bit b4 of byte 2 defines the track path: 0b for a parallel track path, 01b for an opposite track path. Bits b3 to b0 contain the layer type: b2=0b indicates that the disc does not contain rewritable user data area, b2=1b indicates the presence of rewritable user data areas, b1=0b indicates that the disc does not contain recordable user data areas, b1=0b indicates the presence of such areas, b0=0b indicates that the disc does not contain embossed user data areas, b0=1b the presence of such areas.

Bits b7 to b4 of byte 3 (BP(3)) indicate the linear density: 0000b in case of 0,267 micrometer/bit, 0001b in case of 0,293 micrometer/bit, 0101b in case of 0,409 to 0,435 micrometer/bit.

Bits b3 to b0 define the track pitch: 0000b in case of 0.74 micrometer/track and 0001b in case of a 0,80 micrometer/track.

In case of a DVD-ROM disc the bytes 4 to 15 of the physical format information are used to define the data area allocation and the byte 16 to define the BCA (Burst Cutting Area). The remaining are reserved in case of DVD-ROM while the bytes 32 to 39 are used in case of DVD-RW for other purposes. In case of DVD+RW the bytes from byte 16 may be used for other purposes. It is likely that existing DVD-ROM players will not look for the bytes not defined in the DVD-ROM standard whereas DVD-RW and DVD+RW recorders will look for DVD-RW and DVD+RW specific information defined in the reserved bytes according to the DVD-ROM standard.

Figure 4:
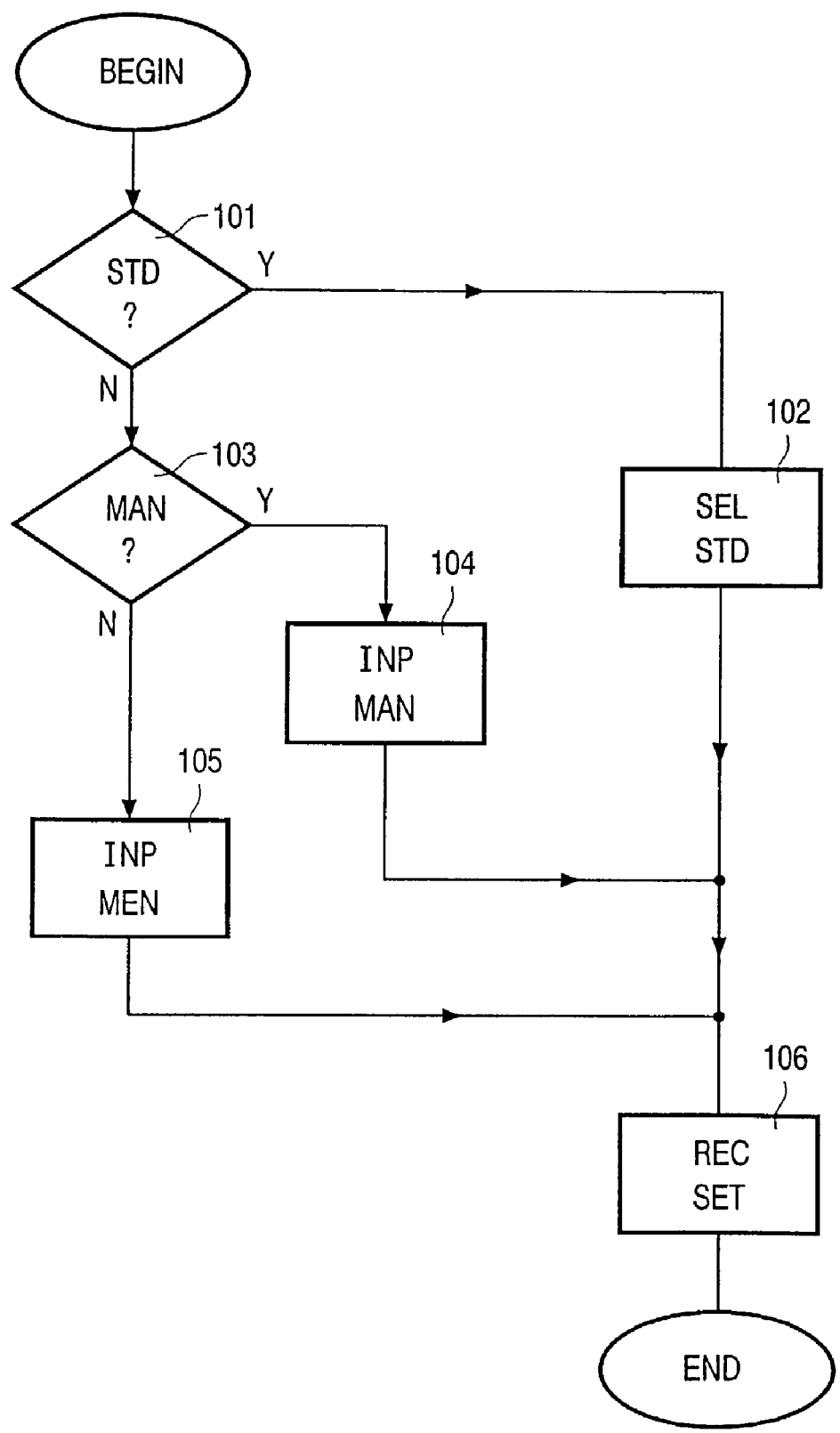
FIG. 4 illustrates a method of recording the bit settings according to the invention.

Normally a disc inserted in a player will be examined for the physical format information so that the player (or player/recorder) can adjust to the bit settings as required. This bit setting may be recorded on the disc during recording. The method according to the invention is illustrated with reference to FIG. 4. In step 101 it is determined whether the standard setting should be selected (step 102) according to the normal rules as prescribed in the standard for DVD+RW. This will be optimal for playback on the same recorder/player and for a large part of other types of players and player/recorders. However a user, may choose (step 104) to select non-standard bit settings which may be inputted either one by one by hand (step 104) or by selection of a special set of non-standard bit settings from a menu (step 105). This menu may contain several brands and models of existing players, whereupon selection of a specific player, a non standard bit setting optimized for the selected players is choosen. The selected bit settings, either standard or non standard are finally written to disc (step 106)

For instance, due to the low reflective nature of a DVD+RW disc, a specific DVD-player may see this disc as a double layer DVD-ROM disc. To satisfy such players, the information indicating the number of layers in the physical formation information is set accordingly. This will cause the player to accept the disc.

Other players will recognize that the disc is rewritable by for instance measuring its reflectivity. Such players would be confused by an intentionally recording a bit setting indicating the presence of two layers. So there is no setting which satisfies all players at the same time and each setting should be according to a selected brand and model or brand or category of models.

Another non standard setting may be changing the standard setting of a DVD+RW disc for the booktype (1001b) to 0000b and the version number (0010b) to 0001b which are the setting to indicate a DVD-ROM disc of version 1.0. It will depend on the type of players that will occur in the market, which non standard settings may be optimal. This may have to be established in practice by trial and error.

A user will normally not deviate from the standard bit settings, but in case of playback incompatibility with a specific player, the may choose to record a specific bit setting. Preferably a user may select out of a list of selectable bit settings for specific brands and models of players that are stored in the recording apparatus according to the invention. According to advantageous embodiments such a list may be updated, for instance by uploading from the internet or public telephone line, by copying the settings of a disc containing the most recent settings.

Figure 5:
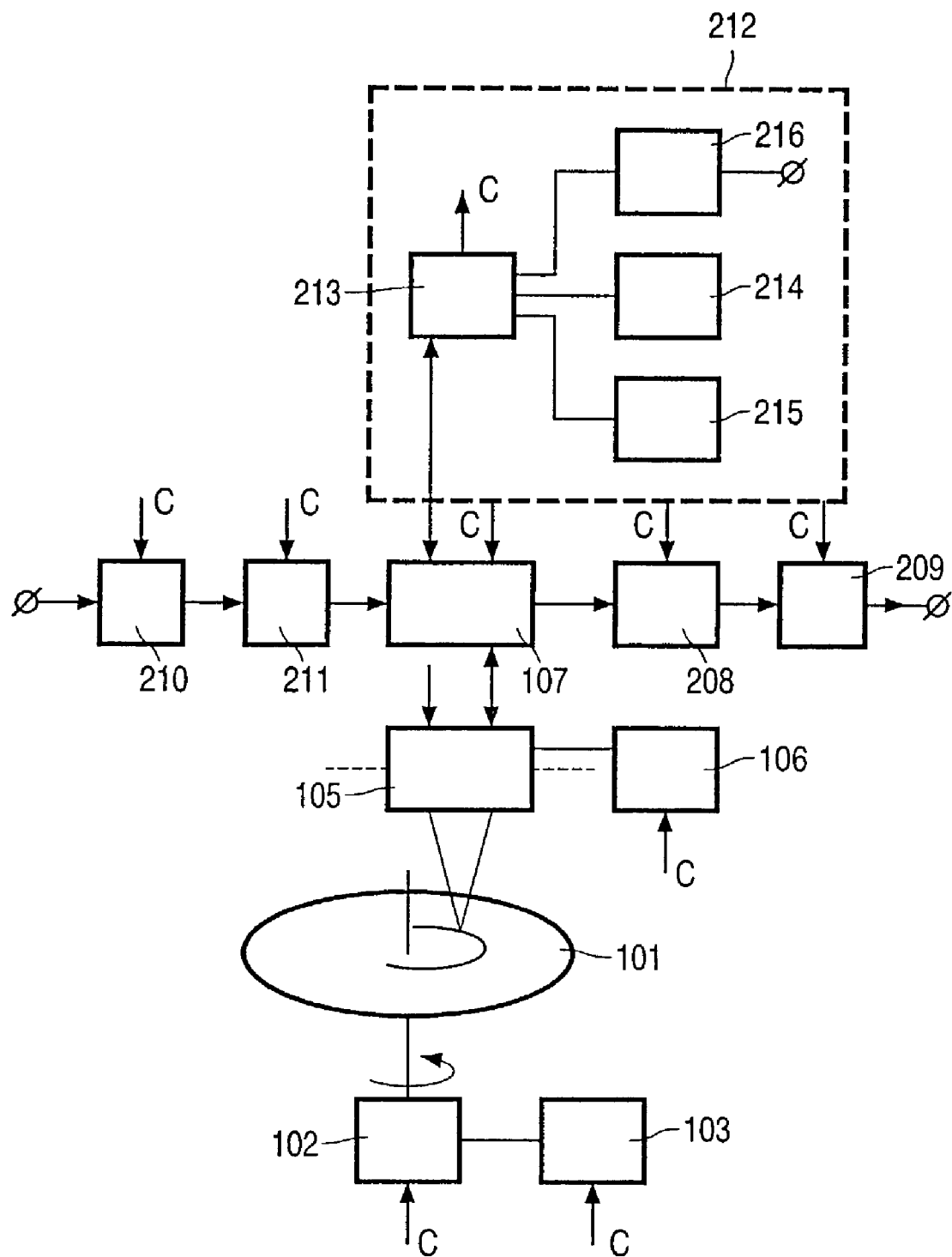
FIG. 5 illustrates a recording apparatus according to the invention.

FIG. 5 illustrates a recording apparatus according to one embodiment of the invention. The recording apparatus comprises means to rotate an optically readable disc 201 by rotating means 202 controlled by servo means 203. The disc 201 is scanned by a focussed laser beam 104, either for recording or reading. This beam 204 is generated by an optical pick-up unit 205 that is positioned above the disc by tracking and focusing means 206. The pick-up unit 205 comprises detector means to convert reflected light to electrical signals. These electrical signals are converted to digital signals that are inputted to buffer means 207. Or, in case of recording, the digital signals to be recorded are outputted from the buffer means 207 to the optical pick-up unit 205. The stored digital signals are inputted to demodulation/error-correction means 208 for error-correction and demodulation. Finally a decoder 209 decodes the encodes signals and outputs either Audio/Video information or Data information.

In case of recording, an encoder 210 encodes received information to be recorded and outputs the encoded signals to modulation/error-correction means 211 for modulating and adding error-correction data.

A control unit 212, comprising a processor 213 and memory means 214 of the read-only type and memory means 215 of the rewritable type, controls the units and receives information therefrom. Additional input means 216 are provide to input either user information and external information from, for instance a data communication line.

The memory means 214 and/or 215 are loaded with a suitable control program for use with the processor 213. The memories 214 and/or 215 further may comprise standard bit settings to be recorded on the disc 101 as well as set of on non-standard bit settings corresponding to specific brands and models of players. This non-standard set may be inputted either by manufacturer or by the user. The user may obtain this information directly from a disc 101, by the input means 216 by inputting manually or inputting by connecting to a data communication line.

The standard bit settings of a disc may also be present on the disc by in the form of a modulation of a sinusoidal radial excursion ("wobble") of a pre-pressed groove on the disc. Normally such a modulation contains address information indicating the position in the spiral groove (ADIP: Absolute Address Information in Pre-groove) with respect to a pre-defined reference position. However, the address information may can also selectively be replaced by additional information such as for examples the Physical Disc Information. When inserting the disc in a recorder, the recorder reads during initialization this additional information and copies the corresponding bit settings to the Control Data area. When a modified bit setting has to recorded, modifications may be made to the physical format information read from the disc, before copying to the control data area, where the data is recorded as marks within or along the groove.

Although the invention has been described with reference to preferred embodiments thereof, it is to be understood that these are not limitative examples. Thus various modifications thereof may become apparent to those skilled in the art, without departing from the scope of the invention, as defined by the claims. The invention can be implemented by means of both hardware and software, and that several 'means' may be represented by the same item of hardware. It is also remarked that the word 'comprising' does not exclude the presence of other elements or steps than those listed in a claim. Any reference signs do not limit the scope of the claims.

The invention claimed is:

1. Method of recording digital information signals on a removable optically readable disc like record carrier, the method comprising:
   generating control data representing the physical structure of an optically readable disc and
   recording the control data on the record carrier, characterized by,
   generating a standardized set of control data set corresponding to the record carrier or
   generating a modified non-standardized set of control data deviating from the standardized set of control data signals.

2. Method according to claim 1, characterized in that, the deviating control data corresponds to the number of information layers of a disc.

3. Method according to claim 1, characterized in that, the deviating control data corresponds to the type of indicating a disc being of the read-only, recordable or rewritable type.

4. Method according to claim 1, characterized in that, the generating of the modified non-standardized data set comprises user modification of control data.

5. Method according to claim 1, characterized in that, the generating of the modified non-standardized data set comprises user selection of a specific type of recording and/or playback device.

6. Recording apparatus for recording digital information signals on a removable optically readable disc like record carrier, comprising
   input means for receive digital information signals representing audio/video or data information,
   encoding means for encoding the received digital information signals into coded information signals,
   recording means comprising a laser beam adapted to record marks on a removable optically readable disc like record carrier corresponding to the coded information signals,
   control means adapted to generate control data signals representing the physical structure of an record carrier and to record the control data signals on the record carriers,
   characterized in that,
   the control means are adapted to generate a set of standardized control data signals corresponding to the record carrier or a set of modified non-standardized control data signals comprising control data deviating from the standardized set of control data signals.

7. Recording apparatus according to claim 6, characterized in that, the control means are adapted to generate deviating control data corresponding to the number of information layer of a disc.

8. Recording apparatus according to claim 6, characterized in that, the control means are adapted to generate deviating control data corresponding to the type of a disc being of the read-only, recordable or rewritable type.

9. Recording apparatus according to claim 6, characterized in that, the recording apparatus comprises user input means adapted to modify the control data signals.

10. Recording apparatus according to claim 6, characterized in that, the recording apparatus comprises user selection means adapted to select a specific type of recording and/or playback device.

* * * * *